(12) United States Patent
Fujikawa et al.

(10) Patent No.: US 6,266,115 B1
(45) Date of Patent: *Jul. 24, 2001

(54) LIQUID CRYSTAL CELL AND LIQUID CRYSTAL DISPLAY DEVICE USING AN ANTIFERROELECTRIC LIQUID CRYSTAL

(75) Inventors: Takayuki Fujikawa; Akira Takeuchi; Norio Yamamoto, all of Nishio; Yuichiro Yamada, Nagoya; Masaaki Ozaki, Kariya, all of (JP)

(73) Assignees: Nippondenso Co., Ltd.; Nippon Soken, Inc., both of Aichi-Pref (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/709,783

(22) Filed: Sep. 9, 1996

(30) Foreign Application Priority Data

Jan. 25, 1996 (JP) .................................................. 8-011249

(51) Int. Cl.[7] .......................... G02F 1/1337; G02F 1/141; C09K 19/02
(52) U.S. Cl. ............................................ 349/133; 349/174
(58) Field of Search .................................... 349/123, 133, 349/174, 172, 134, 132

(56) References Cited

U.S. PATENT DOCUMENTS

| | | | | |
|---|---|---|---|---|
| 5,078,477 | * | 1/1992 | Jono et al. ............................. | 349/174 |
| 5,214,523 | * | 5/1993 | Nito et al. ............................. | 359/100 |
| 5,315,421 | * | 5/1994 | Kurai et al. ............................ | 349/56 |
| 5,436,037 | * | 7/1995 | Okabe et al. ......................... | 349/135 |
| 5,459,481 | * | 10/1995 | Tanaka et al. ......................... | 345/95 |
| 5,576,864 | * | 11/1996 | Takao et al. .......................... | 349/171 |
| 5,589,966 | * | 12/1996 | Hama et al. .......................... | 349/174 |
| 5,631,752 | * | 5/1997 | Tanaka .................................. | 349/173 |
| 5,719,653 | * | 2/1998 | Minato et al. ......................... | 349/156 |
| 5,786,879 | * | 7/1998 | Kodera et al. ........................ | 349/134 |

FOREIGN PATENT DOCUMENTS 7-20474    1/1995   (JP) .

OTHER PUBLICATIONS

McGraw–Hill Electronics Dictionary, 5th edition, J. Markus & N. Sclater, 1994, p.390.*

"Tristable Switching in Surface Stabilized Ferroelectric Liquid Crystal with a Large Spontaneous Polarization," Chandani et al., JP.J.of App.Physics, vol. 27, No. 5, May 1988, pp. L729–L732.

"Ferroelectric Liquid Crystals," Meyer, Mol. Cryst. Liq. Cryst, 1977, vol. 40, pp. 33–48.

"Smectric Layer Rotation in Antiferroelectric Liquid Crystal," Ozaki, et al., JP.J. of App. Physics, vol. 33 (1994), pp. L–1620–L1623.

Abstract Document in 21st Crystal Forum, Fujikawa et al., Sep. 10, 1995, pp. 88–89.

"A Layer Rotation of Antiferroelectric Liquid Crystal in a Rubbing Cell,", Fujikawa et al., (21st Liquid Crystal Forum).

"Analysis of Abnormal Alignment by Optical Methods," Nishino et al., Abstract Document, in 17th Liquid Crystal Forum, pp. 32–33.

* cited by examiner

Primary Examiner—William L. Sikes
Assistant Examiner—Dung Nguyen
(74) Attorney, Agent, or Firm—Pillsbury Winthrop LLP

(57) ABSTRACT

A liquid crystal cell and liquid crystal display device include: two electrode substrates facing each other through a plurality of spacers; each electrode substrate being formed by superimposing a glass substrate, a transparent electrode and an alignment film; and an antiferroelectric liquid crystal being injected between alignment films; wherein, an alignment treatment is performed to each alignment film so that an angle of layer rotation of the antiferroelectric liquid crystal is defined within a predetermined allowable range.

9 Claims, 17 Drawing Sheets

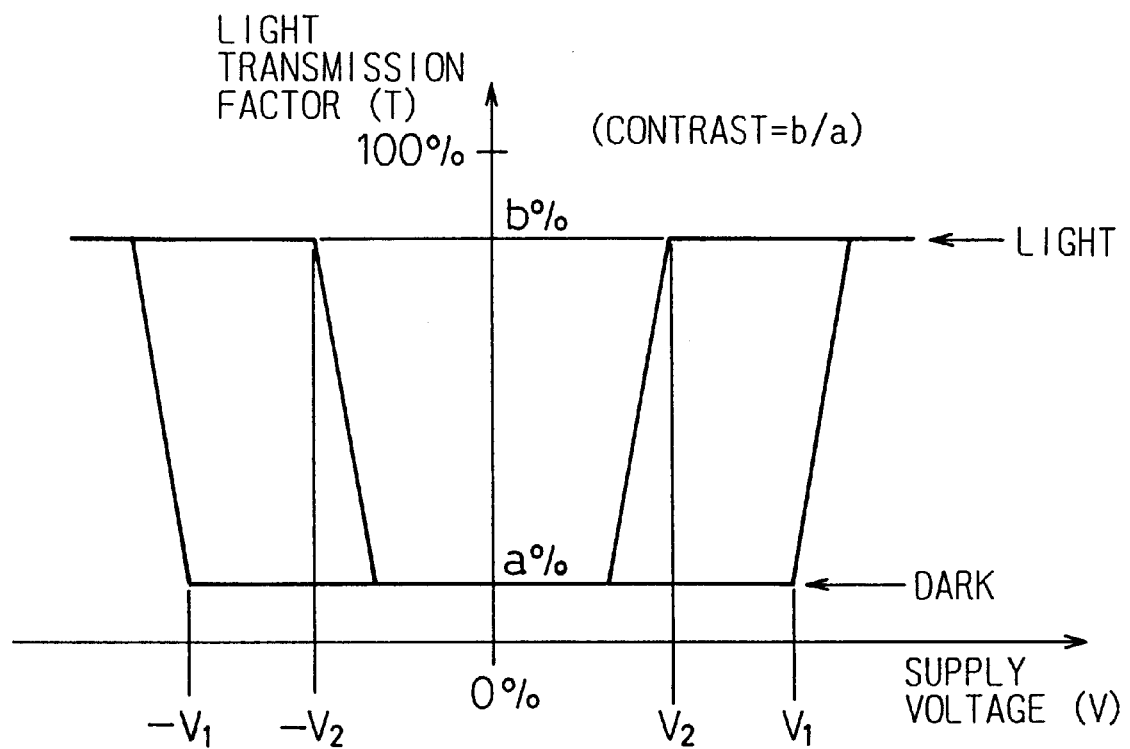

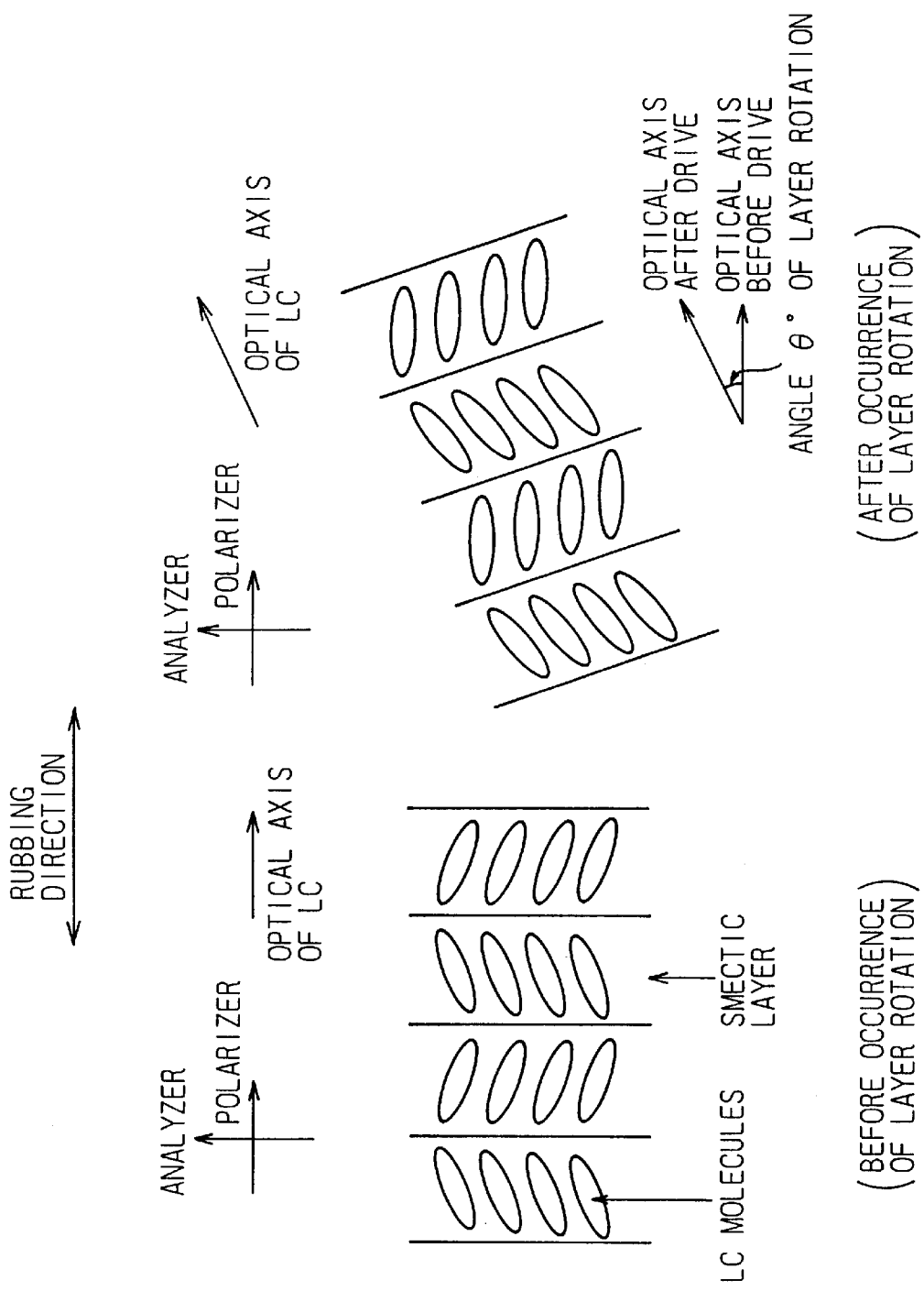

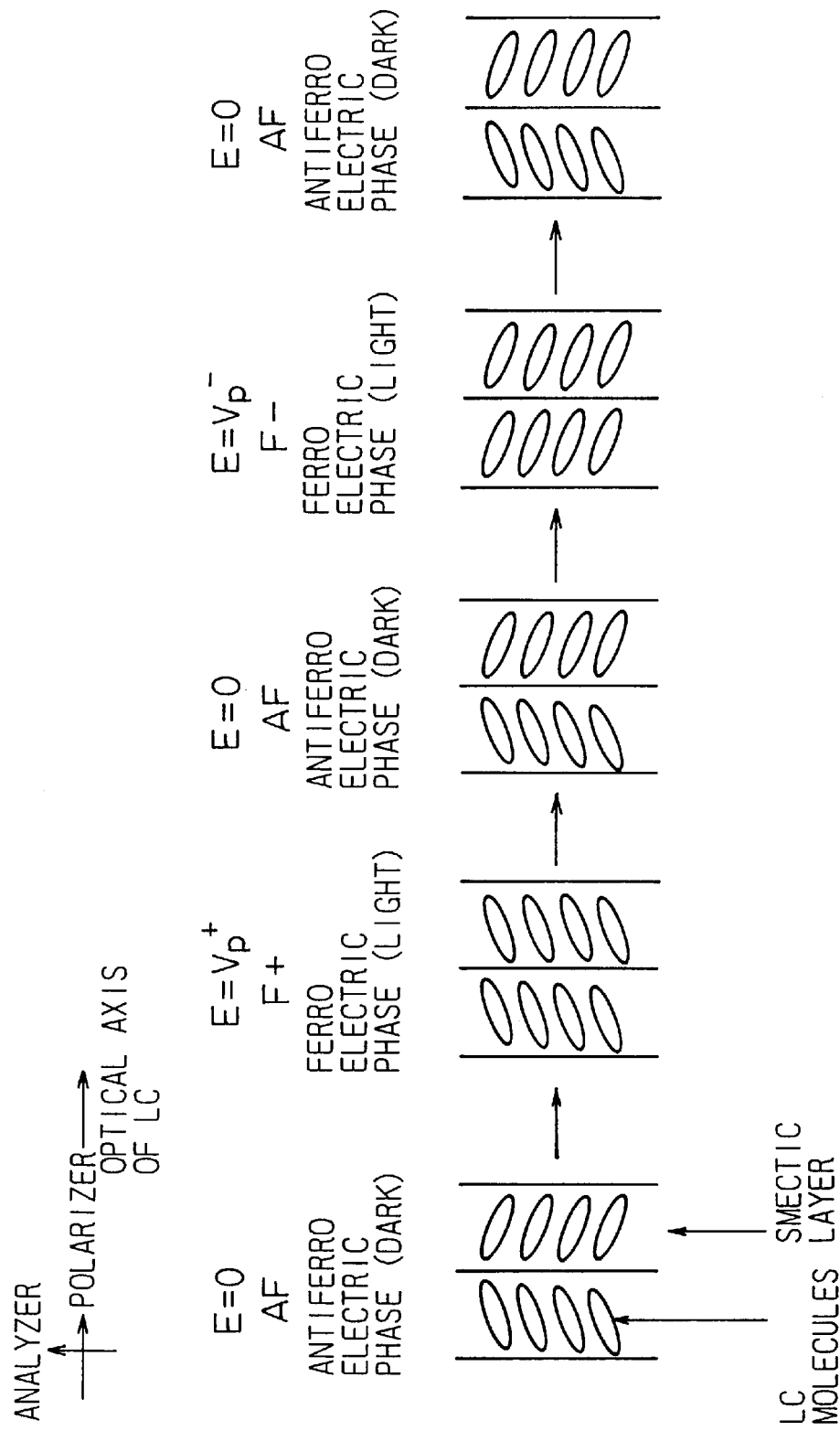

Fig.7

| CELL No. | $t_d^+$ (ms) | $t_d^-$ (ms) | $\Delta t_d$ (ms) | $\Delta t_d / t_{dav}$ | $\theta°$ |
|---|---|---|---|---|---|
| A11 | 28.0 | 15.3 | 12.7 | 0.60 | 1.5 |
| A12 | 22.7 | 11.6 | 11.1 | 0.65 | 2.1 |
| A13 | 21.3 | 19.8 | 1.5 | 0.04 | 0.5 |
| A14 | 17.2 | 28.9 | −11.7 | 0.51 | 1.3 |
| A15 | 17.8 | 22.7 | −4.9 | −0.24 | −0.7 |
| A16 | 18.5 | 21.8 | −3.3 | −0.16 | −0.8 |
| A17 | 15.7 | 26.4 | −10.7 | −0.51 | −1.8 |
| A18 | 18.3 | 23.5 | −5.2 | −0.25 | −0.7 |

Fig.8

| CELL No. | $t_d^+$ (ms) | $t_d^-$ (ms) | $\Delta t_d$ (ms) | $\Delta t_d / t_{dav}$ | $\theta°$ |
|---|---|---|---|---|---|
| B11 | 23.8 | 8.6 | 15.2 | 0.94 | 4.1 |
| B12 | 35.1 | 9.4 | 25.7 | 1.16 | 4.4 |
| B13 | 41.5 | 8.4 | 33.1 | 1.33 | 6.7 |
| B14 | 31.8 | 13.0 | 18.8 | 0.84 | 3.3 |

Fig.9

| CELL No. | $t_d^+$ (ms) | $t_d^-$ (ms) | $\Delta t_d$ (ms) | $\Delta t_d / t_{dav}$ | $\theta°$ |
|---|---|---|---|---|---|
| C11 | 8.9 | 24.0 | −15.1 | −0.92 | −2.4 |
| C12 | 7.3 | 35.6 | −28.3 | −1.32 | −2.7 |
| C13 | 3.4 | 61.0 | −57.6 | −1.79 | −4.8 |
| C14 | 6.9 | 43.0 | −36.1 | −1.45 | −3.0 |

Fig.12

| CELL No. | DEPRESSED AMOUNT (mm) | | UPPER △nd1 (nm) | LOWER △nd2 (nm) | △nd2−△nd1=△D (nm) | θ° |
|---|---|---|---|---|---|---|
| | UPPER | LOWER | | | | |
| D11 | 0.3 | 0.5 | 0.25 | 0.35 | 0.1 | 0.8 |
| D12 | 0.3 | 0.5 | 0.26 | 0.44 | 0.18 | 1.1 |
| D13 | 0.3 | 0.5 | 0.25 | 0.45 | 0.2 | 2.1 |
| D14 | 0.3 | 0.5 | 0.23 | 0.57 | 0.34 | 7.2 |
| D15 | 0.3 | 0.5 | 0.28 | 0.42 | 0.14 | 3 |
| D16 | 0.3 | 0.5 | 0.25 | 0.51 | 0.26 | 2.6 |
| D17 | 0.3 | 0.3 | 0.35 | 0.2 | −0.15 | −4 |
| D18 | 0.3 | 0.3 | 0.3 | 0.31 | 0.01 | 0.6 |

Fig.13

| CELL No. | DEPRESSED AMOUNT (mm) | | UPPER △nd1 (nm) | LOWER △nd2 (nm) | △nd2−△nd1=△D (nm) | θ° |
|---|---|---|---|---|---|---|
| | UPPER | LOWER | | | | |
| D19 | 0.3 | 0.3 | 0.44 | 0.4 | −0.04 | −0.6 |
| D20 | 0.5 | 0.5 | 0.49 | 0.52 | 0.03 | 0.3 |
| D21 | 0.5 | 0.5 | 0.42 | 0.45 | 0.03 | −0.4 |
| D22 | 0.5 | 0.5 | 0.39 | 0.42 | 0.03 | −0.3 |
| D23 | 0.5 | 0.5 | 0.42 | 0.39 | −0.06 | −0.3 |
| D24 | 0.5 | 0.3 | 0.58 | 0.28 | −0.3 | −7.5 |
| D25 | 0.5 | 0.3 | 0.53 | 0.23 | −0.25 | −3.5 |
| D26 | 0.5 | 0.3 | 0.58 | 0.22 | −0.36 | −8 |

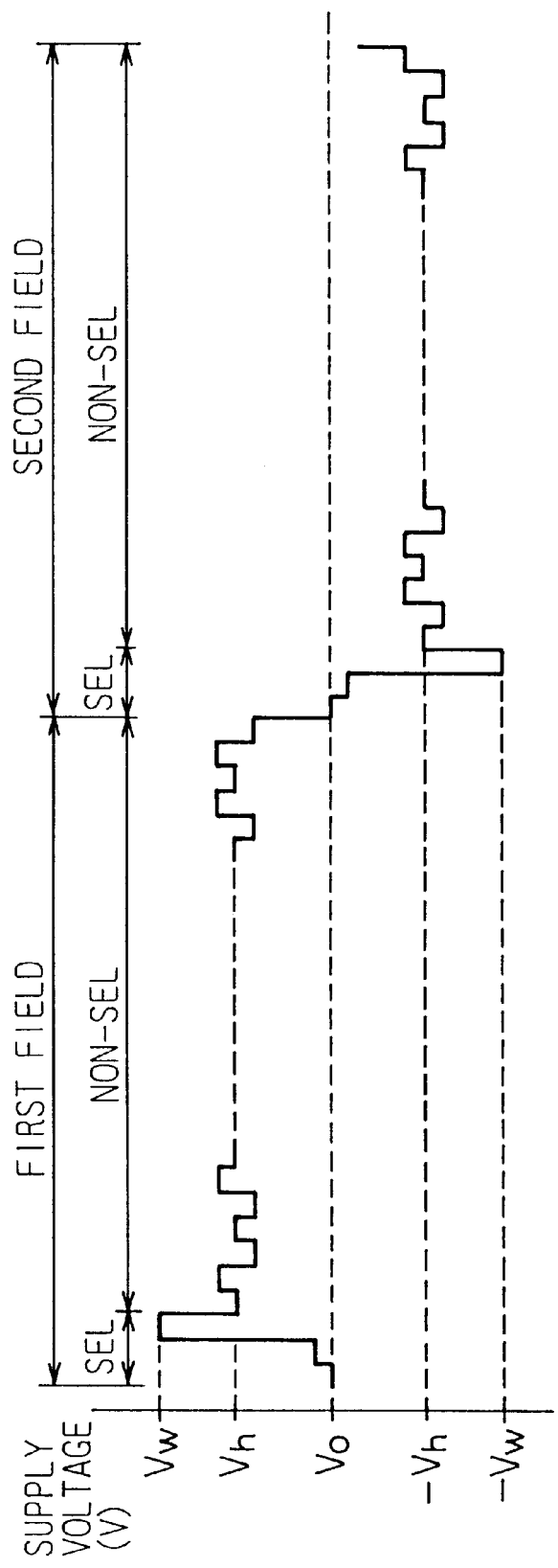

LIQUID CRYSTAL CELL AND LIQUID CRYSTAL DISPLAY DEVICE USING AN ANTIFERROELECTRIC LIQUID CRYSTAL

BACKGROUND OF THE INVENTION

1. Field of the Invention

The present invention relates to a liquid crystal cell and liquid crystal display device using an antiferroelectric liquid crystal. The present invention is advantageously used for a liquid crystal TV, a liquid crystal watch, various display devices, etc.

2. Description of the Related Art

Recently, a liquid crystal cell has been widely used as a display element having many features, for example, thin configuration, light weight, and low power consumption. In general, almost all display elements are formed of TN (Twisted Nematic)-type liquid crystal cells which use nematic liquid crystals. The display method using the TN-type liquid crystal cell has a very slow response speed (time). This is because the liquid crystal cell is driven based on an anisotropic characteristic of a dielectric constant of the liquid crystal. Accordingly, it has been required to improve the response speed in the TN type liquid crystal.

On the other hand, another liquid crystal cell, which uses the liquid crystal having a chiral smectic C phase (below, SmC* phase) indicating a ferroelectric characteristic (this type of liquid crystal was found by Mr. Meyer et al.), has a high response speed and a good storage characteristic which could not be achieved by the above nematic liquid crystal. Accordingly, recently, research and development have been performed to discover a ferroelectric liquid crystal cell having the above good characteristics.

However, it is very difficult to realize good molecular alignment of liquid crystal molecules and good storage characteristic, both of which are necessary for providing a good display with the above-described liquid crystal cell, because this type of liquid crystal cell is easily damaged by a shock applied from outside.

Further, recently, in the liquid crystal having the SmC* phase, an antiferroelectric phase ($SmC_A$* phase), which has three stable states at the low temperature of the SmC* phase, was found by Ms. Chandani et al.

In the $SMC_A$* phase, dipoles (i.e., liquid crystal molecules) are arranged in anti-parallel for an adjacent layer (i.e., as shown in FIG. 4 dipoles are arranged in parallel in the same layer, but not arranged in parallel for the adjacent layer), and this arrangement indicates a thermodynamically stable state. Further, in the $SmC_A$* phase, there is an electric field-induced phase transition between the antiferroelectric phase and the ferroelectric phase, and this electric field-induced phase transition features a double hysteresis characteristic (i.e., switching characteristic) and a threshold value for a supply voltage. As a result, research and development on the switching characteristic and threshold value have begun in order to obtain a new display method using the antiferroelectric liquid crystal cell.

Accordingly, the present invention aims to provide an improved liquid crystal cell and liquid crystal display device using an antiferroelectric liquid crystal.

SUMMARY OF THE INVENTION

The object of the present invention aims to provide an improved liquid crystal cell and a liquid crystal display device using an antiferroelectric liquid crystal which can suppress a layer rotation in the antiferroelectric liquid crystal.

In accordance with one aspect of the present invention, there is provided a liquid crystal cell including: two electrode substrates facing each other and separated by a plurality of spacers; each electrode substrate being formed by superimposing a glass substrate, a transparent electrode and an alignment film; and an antiferroelectric liquid crystal being injected between alignment films; wherein, an alignment treatment is performed to each alignment film so that an angle of layer rotation of the antiferroelectric liquid crystal is defined within a predetermined allowable range.

In a preferred embodiment, the predetermined allowable range of the angle is defined from −1° to +1°.

In another preferred embodiment, the alignment treatment for each alignment film is performed in such a way that a response time from a first ferroelectric state to an antiferroelectric state is approximately the same as a response time from a second ferroelectric state to the antiferroelectric state in the antiferroelectric liquid crystal.

In still another preferred embodiment, the alignment treatments for each alignment film has the same rubbing conditions.

In accordance with another aspect of the present invention, there is provided a liquid crystal cell including: two electrode substrates facing each other and separated by a plurality of spacers; each electrode substrate being formed by superimposing a glass substrate, a transparent electrode and an alignment film; and an antiferroelectric liquid crystal being injected between two electrode substrates; wherein, an alignment treatment is performed to each alignment film so that the difference between optical retardations of each refractive index after an alignment treatment to each alignment film is defined within a predetermined allowable range.

In a preferred embodiment, the predetermined allowable range is defined from −1 nm to +1 nm.

In accordance with still another aspect of the present invention, there is provided a liquid crystal display device including: a liquid crystal cell having two electrode substrates facing each other through a plurality of spacers and each electrode substrate being formed by superimposing a glass substrate, a transparent electrode and an alignment film, and an antiferroelectric liquid crystal being injected between two electrode substrates, being set to a first or second ferroelectric state when a positive or negative voltage is applied thereto, and being set to an antiferroelectric state when no voltage is applied thereto; and a control apparatus connected to the liquid crystal cell for applying the positive or negative voltage thereto as a supply voltage; wherein said control apparatus controls so as to superimpose a direct current component onto the supply voltage and to apply it to the liquid crystal cell so that a response time from a first ferroelectric state to an antiferroelectric state is approximately the same as a response time from a second ferroelectric to the antiferroelectric state.

BRIEF DESCRIPTION OF DRAWINGS

In the drawings:

FIG. 1 is an explanatory view for explaining a double hysteresis characteristic between a light transmission factor and supply voltage in an antiferroelectric liquid crystal;

FIGS. 2A and 2B are views for explaining the state of liquid crystal molecules in each layer before and after occurrence of layer rotation of the antiferroelectric liquid crystal in the liquid crystal cell which was rubbed;

FIG. 4 is a view for explaining a change of direction of the liquid crystal molecules in the antiferroelectric liquid crystal when the supply voltage (i.e., AC voltage) is applied to the antiferroelectric liquid crystal;

FIG. 7 shows measured data for a sample 1;

FIG. 8 shows measured data for a sample 2;

FIG. 9 shows measured data for a sample 3;

FIGS. 12 and 13 show measured data of a liquid crystal according to a second embodiment;

FIG. 19 shows voltage waveforms applied to any pixel in the liquid crystal cell.

DESCRIPTION OF THE PREFERRED EMBODIMENTS

Figure 3A:
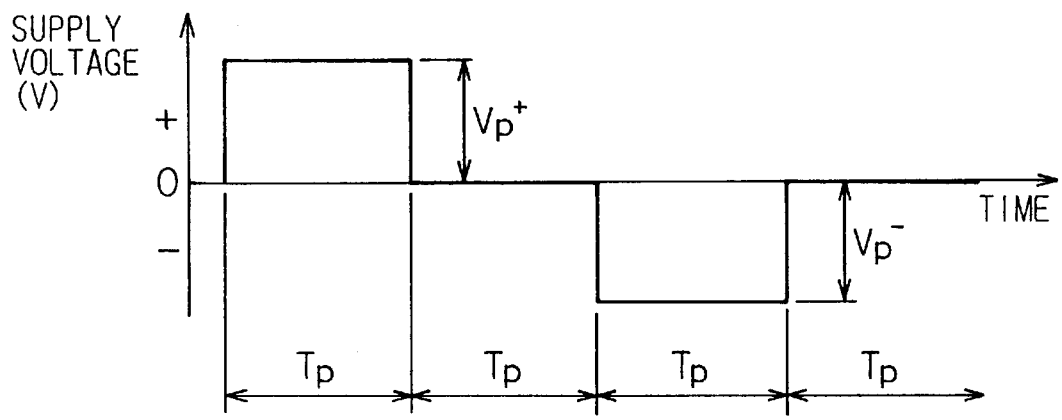
FIG. 3A is a signal timing chart indicating waveforms of the supply voltage when the antiferroelectric liquid crystal was injected into the liquid crystal cell.

Before describing the preferred embodiments, the conventional art and its problem will be explained in detail with reference to the drawings.

FIG. 1 is an explanatory view for explaining the double hysteresis characteristic of the antiferroelectric liquid crystal. In this graph, the ordinate denotes a light transmission factor (%), and the abscissa denotes a supply voltage (v).

The double hysteresis characteristic can be obtained as follows. That is, for example, two electrode substrates on which an alignment treatment was previously performed for the liquid crystal molecules, are superimposed on each other through spacers; the antiferroelectric liquid crystal is injected between the two electrode substrates; the liquid crystal cells are arranged on a polarization microscope having a photomultipler; a voltage having triangle waveform is applied to the liquid crystal cell in which two polarization sheets are arranged in a cross-nicol state (i.e., polarization directions intersect each other in two polarization boards); and changes of the light transmission amount are measured.

Further, the contrast of the liquid crystal cell is expressed by a ratio (b/a) between a light brightness and dark brightness. In this case, the light brightness corresponds to "b" %, and the dark brightness corresponds to "a" % in FIG. 1. These values of the brightness can be obtained as follows. That is, the brightness of 100% can be determined by setting the polarization microscope so as to always transmit a constant amount of the transmission light, and the brightness of 0% can be determined at the time when the light is completely cut off.

In order to improve the contrast of the liquid crystal cell, it is effective to reduce the dark brightness based on the above definition of the contrast. The dark brightness is determined by the light transmission factor with no electric field, and is dependent on the alignment state of the antiferroelectric liquid crystal used for the liquid cell. That is, in the antiferroelectric liquid crystal, the liquid crystal molecules constitute layers which are called "smectic layers". This structure is different from the nematic liquid crystal. For example, when injecting the antiferroelectric liquid crystal into the liquid cell which was processed by using a one-axis alignment process shown by a rubbing direction in FIG. 2A, an optical axis of the liquid cell is oriented to the rubbing direction.

FIGS. 2A and 2B are views for explaining a state of liquid crystal molecules before and after occurrence of the layer rotation of the antiferroelectric liquid crystal in the liquid crystal cell in which the rubbing process was performed.

As shown in FIG. 2A, for example, in the antiferroelectric liquid crystal, the smectic layer is formed perpendicular to the rubbing direction. Accordingly, when superimposing one of two polarization sheets having the cross-nicol state onto the optical axis of the antiferroelectric liquid crystal, it is possible to obtain the dark brightness.

In this state, when the liquid crystal is driven (i.e., the voltage is applied), as shown in FIG. 2B, the smectic layer shifts (rotates) from an initial state (i.e., the direction perpendicular to the rubbing direction), and rotates within a plane parallel to both electrode substrates (i.e., the plane parallel to this drawing). This is called "layer rotation". When the layer rotation occurs, since the optical axis of the antiferroelectric liquid crystal shifts from the optical axis of the polarization sheet, the light leakage becomes large in the dark state so that the contrast becomes worse.

Further, recently, the layer rotation of the antiferroelectric liquid crystal was reported by Mr. Nakayama et al (see An Abstract Document in 20th Liquid Crystal Forum, p 106, 1994). This report teaches that, when an AC voltage having an asymmetric waveform is applied to a so-called "spacer edge cell" (this cell has no alignment film, and the antiferroelectric liquid crystal thereof was horizontally aligned), the smectic layer is rotated in the vicinity of the edge. However, this report does not teach why the layer rotation occurs and how to prevent occurrence of the layer rotation.

On the other hand, the inventor found the following fact. That is, in the liquid crystal cell having an alignment film, which is provided for stabilizing the state of the alignment of the antiferroelectric liquid crystal, on both electrode substrates, the same layer rotation as the above occurs in the liquid crystal molecules although an AC voltage having a symmetric waveform was applied to this liquid crystal cell.

The present invention is based on new structural factors for controlling (suppressing) occurrence of the layer rotation in the antiferroelectric liquid crystal cell.

That is, as results of various tests, the inventor found that the layer rotation may be caused by an asymmetricity of the response speed at the down-slope portion of the waveform (see (a) and (b) in FIG. 3B) of the light transmission factor of the antiferroelectric liquid crystal when the AC voltage was applied to the liquid crystal cell as explained below.

Figure 3B:
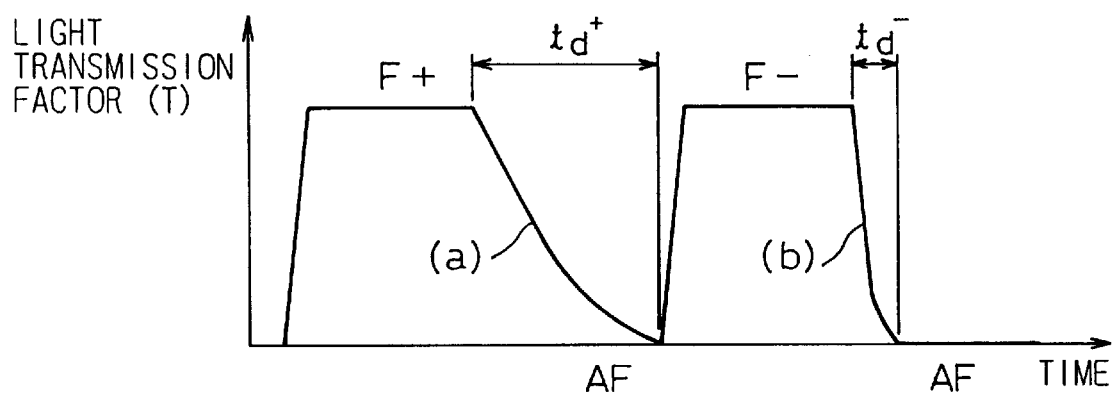
FIG. 3B is a signal timing chart indicating an optical response of the antiferroelectric liquid crystal when the supply voltage was applied to the liquid crystal cell.

FIG. 3A is a signal timing chart of a waveform of the supply voltage when the antiferroelectric liquid crystal was injected into the liquid crystal cell, and FIG. 3B is a signal timing chart indicating an optical response of the antiferroelectric liquid crystal when the supply voltage was applied to the liquid crystal cell. Further, FIG. 4 is a view for explaining changes in direction of the liquid crystal molecules in the antiferroelectric liquid crystal when the supply voltage (i.e., AC voltage) was applied to the antiferroelectric liquid crystal.

The asymmetricity of the response speed in the light transmission factor of the antiferroelectric liquid crystal can be explained with reference to FIG. 3B. That is, the response time $t_d^+$ from the light state ($F^+$: ferroelectric phase) to the dark state (AF: antiferroelectric phase) when the AC voltage was applied to the antiferroelectric liquid crystal to create a positive electric field, is different from the response time $t_d^-$ from the light state (F: ferroelectric phase) to the dark state (AF: antiferroelectric phase) when the AC voltage was applied to the antiferroelectric liquid crystal to create a in the negative electric field.

Accordingly, the inventor found that, if the response time $t_d^+$ can be equalized to or can be approximated to the response time $t_d^-$, it is possible to suppress the layer rotation of the antiferroelectric liquid crystal, and to prevent the reduction of the contrast during operation of the liquid crystal cell.

That is, as explained above, the electric field-induced phase transition in three states AF, $F^+$ and $F^-$ is a proper characteristic for the antiferroelectric liquid crystal. Accordingly, in the liquid crystal cell which is driven by the AC voltage, the inventor found that, if the response time from a first stable state (ferroelectric phase) to a third stable phase (antiferroelectric phase) can be equalized to or can be approximated to the response time from a second stable state (ferroelectric phase) to the third stable state (antiferroelectric phase), it is possible to suppress the layer rotation of the antiferroelectric liquid crystal.

Further, the inventor found that if both response speeds can be equalized to or can be approximated to each other, it is possible to suppress the layer rotation in spite of rubbing conditions or the structure of a liquid crystal panel.

How to equalize or approximate both response speeds will be briefly explained below.

(1) In both electrode substrates, by equalizing or approximating the alignment of the antiferroelectric liquid crystal, it is possible to realize the same alignment state between the states $F^+$ and $F^-$. For example, making a kind of alignment film of the antiferroelectric liquid crystal uniform, to equalizing the rubbing conditions, and making uniform the anisotropy of an optical refractive index of both alignment films, are considered to realize the same alignment state.

(2) For the polarity having the long response time of the light transmission factor of the antiferroelectric liquid crystal, to applying an offset voltage (i.e., to superimpose a direct current (DC) component) to the supply voltage for the liquid crystal cell is considered to realize the same alignment state.

From the above viewpoints, the present invention aims to provide an improved liquid crystal cell and a liquid crystal display device which can suppress the layer rotation of the antiferroelectric liquid crystal.

According to the invention, the alignment treatment is performed to each alignment film so that an angle of the layer rotation of the antiferroelectric liquid crystal can be contained within a predetermined allowable range.

According to this alignment process, it is possible to suppress the layer rotation of the antiferroelectric liquid crystal. As a result, it is possible to ensure good contrast on the display.

According to the invention, when the alignment treatment for each alignment film is performed in such a way that the response time from the first ferroelectric state to the antiferroelectric state of the antiferroelectric liquid crystal is approximated to the response time from the second ferroelectric state to the antiferroelectric state, the angle of the layer rotation can be contained in the predetermined allowable range so that it is possible to achieve the desired effect.

According to the invention, if each alignment treatment to both alignment films is performed based on the same rubbing conditions, it is possible to further suppress the layer rotation of the antiferroelectric liquid crystal so that it is possible to improve the contrast on the display.

According to the invention, the alignment treatment is performed on each alignment film so that the difference between the optical retardations for each refractive index is contained within the range of the predetermined allowable value after the alignment treatment was performed on both alignment films.

According to this alignment treatment, it is possible to suppress the layer rotation of the antiferroelectric liquid crystal so that it is possible to ensure the preferable contrast on the display.

Further, according to the invention, in a control apparatus, the DC component is superimposed onto the supply voltage, and the superimposed supply voltage is applied to the liquid crystal cell so that the response time from the first ferroelectric state to the antiferroelectric state of the liquid crystal cell is approximated to the response time from the second ferroelectric state to the antiferroelectric state.

According to this process in the control apparatus, it is possible to suppress the layer rotation of the antiferroelectric liquid crystal so that it is possible to ensure a good contrast on the display.

The first embodiment according to the present invention will be explained in detail with reference to FIGS. 5 to 11.

Figure 5:
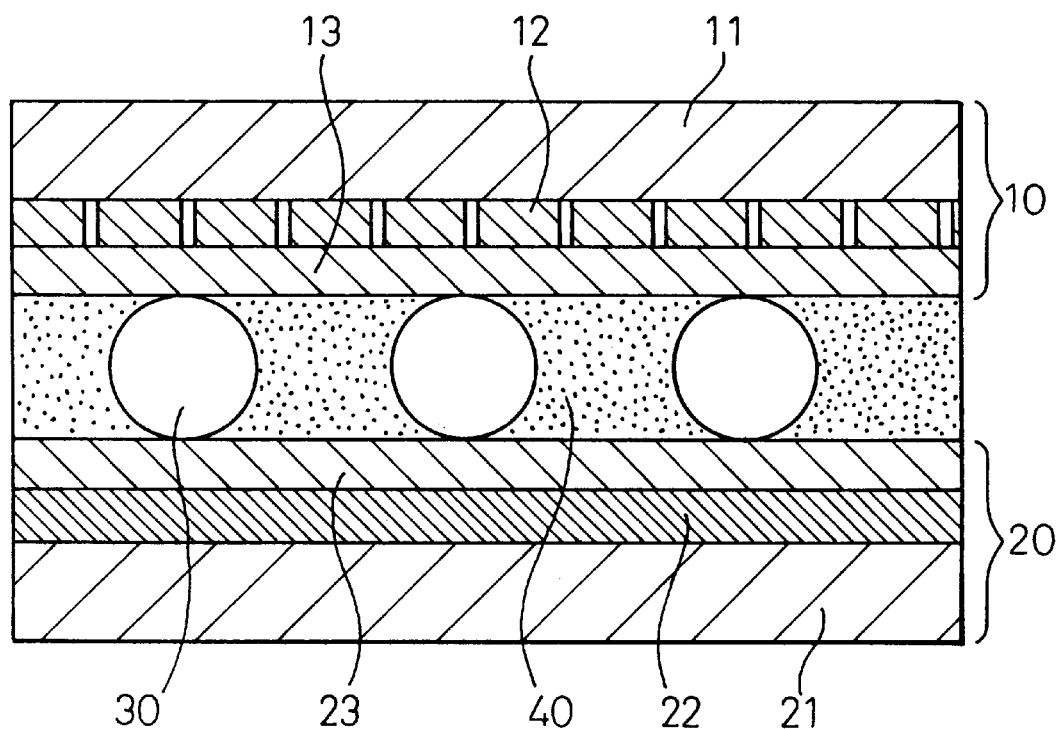
FIG. 5 is schematic sectional view of a liquid crystal cell according to a first embodiment of the present invention.
Figure 6A:
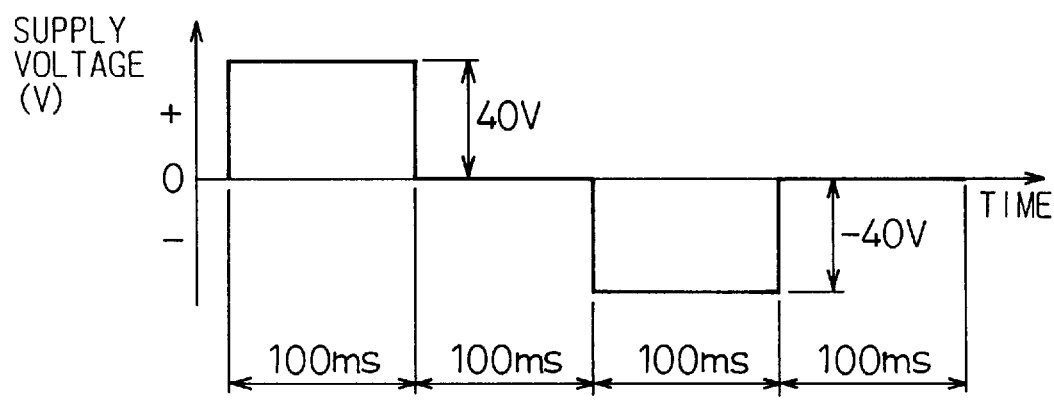
FIG. 6A is a signal timing chart corresponding to FIG. 3A.
Figure 6B:
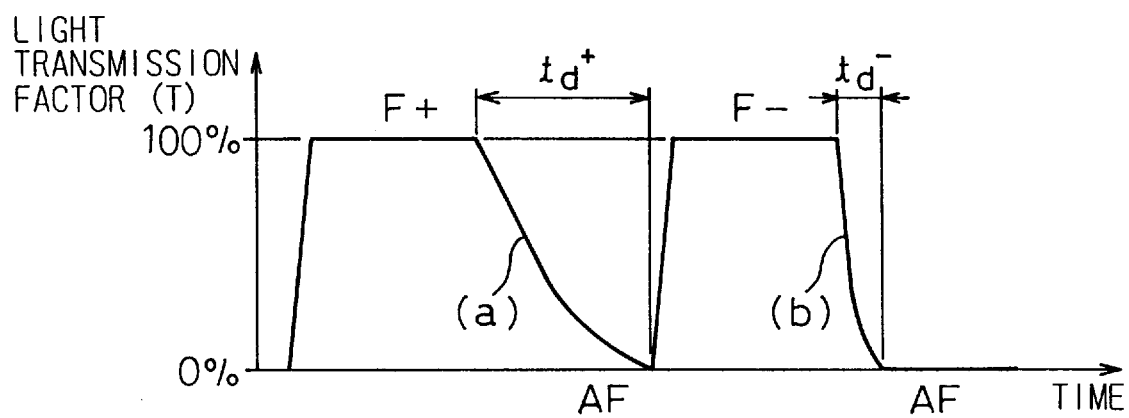
FIG. 6B is a signal timing chart corresponding to FIG. 3B.

FIG. 5 is schematic sectional view of one liquid crystal cell according to a first embodiment of the present invention. FIG. 6A is a signal timing chart corresponding to FIG. 3A, and FIG. 6B is a signal timing chart corresponding to FIG. 3B.

In FIG. 5, reference numbers 10 and 20 denote substrates; 11 and 21 glass substrates; 12 and 22 transparent electrodes; 13 and 23 alignment films; 30 spacers; and 40 the antiferroelectric liquid crystal.

The liquid crystal cell is formed by superimposing two electrode substrates 10 and 20 through the spacers 30, belt-like sealing members and adhesive fine grain (not shown), and by injecting the antiferroelectric liquid crystal 40 between two electrode substrates 10 and 20 (i.e., between alignment films 13 and 23).

In this case, the electrode substrate 10 is formed by the glass substrate 11, the transparent electrodes 12 each consisting of an ITO (Indium Tin Oxide) and formed by plural rows on an inner surface of the glass substrate 11, an insulating film (not shown) and the alignment film 13. The electrode substrate 20 has the same structure as the substrate 10.

The transparent electrodes 12 and 22 are formed so as to constitute a plurality of pixels arranged in a matrix. In this case, the thickness of the glass substrates 11 and 12 is 1.1 millimeters (mm), and the thickness of the layer of the antiferroelectric liquid crystal 40 is 1.8 μm.

Two alignment films 13 and 23 face each other through the antiferroelectric liquid crystal 40, and are formed by high polymers (for example, polyimide) having the same thickness (for example, 200 Å). Further, the rubbing process is performed in each inner surface of the alignment films 13 and 23 in order to align the liquid crystal molecules of the antiferroelectric liquid crystal 40. In this case, the rubbing process was performed in accordance with the following conditions.

That is, the rubbing process was performed by using a known rubbing roller (not shown). The rubbing directions are anti-parallel to each other between the alignment films 13 and 23. Further, the transfer direction of the rubbing roller is opposite to the rotational direction of the rubbing roller.

Nylon was used for the rubbing cloth. The radius of the rubbing roller was 3.7 cm, the rotational speed of the roller was 1000 r.p.m, the moving speed of a stage which moved the liquid crystal cell was 3.3 cm/sec, and the number of the rubbing process was five. An amount (depth) depressed by the rubbing roller (below, depressed amount) on the inner surface of the alignment film, is 0.3 mm to 0.5 mm.

An antiferroelectric liquid crystal 40 is formed by mixing the following materials (i.e., mixture), i.e., 4-(1-trifluoromethylheptoxycarbonyl)phenyl-4'-octyloxybiphenyl-4-carboxylate (below, TPMHPOBC),
4-(1-trifluoromethylheptoxycarbonyl)phenyl-4'-decylbiphenyl-4-carboxylate (below, TFMHPDBC),
4-(methylheptoxycarbonyl)phenyl-4'-octyloxybiphenyl-4-carboxylate (below, MHPOBC), and
a homologue of the above materials.

The mixture indicates the following phase sequence, i.e., crystal→SmC$_A$*→SmC*→SmA→an isotropic liquid Where, the SmC$_A$* phase represents the antiferroelectric smectic liquid crystal phase, the SmC* phase represents the ferroelectric smectic liquid crystal phase, and the SmA represents a paraelectric smectic liquid crystal phase.

The following method was applied to measure the layer rotation of the liquid crystal cell which was prepared by the above conditions.

First, on a hot stage (not shown) in which the temperature can be controlled, the liquid crystal cell is put under a polarization microscope so that the electrode substrate 10 is positioned above the electrode substrate 20. At that time, the liquid crystal cell is arranged between both polarization sheets, which are arranged in the cross-nicol, in the polarization microscope. Further, the photomultiplier which detects the intensity of the transmitted light is mounted to the upper side of the polarization microscope and connected to a cathode-ray oscilloscope in order to monitor the electrical-optical characteristic of the antiferroelectric liquid crystal.

In the above monitoring process, the stage is rotated so as to give a dark viewfield when there is no electric field. That is, the optical axis of the antiferroelectric liquid crystal coincides with the optical axis of the polarization sheets so that the angle becomes 0° between the optical axes.

In the above conditions, after the wiring was performed in such a way that the electrode substrate 10 becomes positive and the electrode substrate 20 becomes negative, the AC voltage (i.e., supply voltage) having the waveform shown in FIG. 6A is applied between the electrode substrates 10 and 20. Then, the response time ($t_d^+$) from the state F$^+$ to the state AF, the response time ($t_d^-$) from the state F$^-$ to the state AF, and the angle θ° of the layer rotation, are measured.

The response time $t_d$ ($t_d^+$ or $t_d^-$) is measured in such a way that, just after the AC voltage was applied, and it was confirmed that the intensities of the transmitted light at the state F (F$^+$ and F$^-$) in both polarities were equal each other, the intensity of the state F is set to 100% and the intensity of the state AF is set to 0%, then, the elapsed time needed to change the intensity of the transmitted light from 100% to 0%, is measured in both polarities.

When the response time becomes longer than 100 msec, the measurement is performed in such a way that, since the state is not completely returned from the state F to the state AF, a reset term of the supply voltage is changed to the term for returning to the state AF at only measurement of the response term.

Further, even if the difference of the response time ($t_d^+$ minus $t_d^-$) in one liquid crystal cell is the same as the difference of the response time ($t_d^+$ minus $t_d^-$) in the other liquid crystal cell, since the length of each response time ($t_d^+$ and $t_d^-$) in one cell is slightly different from that of the other cell, the asymmetricity of the polarity of the response time is also different. Accordingly, a degree of the asymmetricity of the response time was standardized as follows.

That is, the difference $\Delta t_d$ ($=t_d^+ - t_d^-$) between two response times and a mean value $t_{dav}$ ($=(t_d^+ + t_d^-)/2$) of two response times were calculated, and the difference $\Delta t_d$ was divided by the mean value $t_{dav}$ and, then, the mean value $\Delta t_d / t_{dav}$ was used as the degree.

On the other hand, regarding the angle θ° of the layer rotation, in the non electric field after the voltage was applied to the liquid cell and ten minutes had elapsed, the stage is rotated so as to obtain a dark viewfield. The rotational angle is defined as the angle θ°. The reason for use of the angle θ° after ten minutes has elapsed lies in that the increase of the angle θ° is saturated after about ten minutes in each liquid crystal cell.

Further, the direction of the angle θ° of the layer rotation of the antiferroelectric liquid crystal is defined in such a way that, when the liquid crystal cell (the electrode substrate 10 is positioned at the upper side) is observed from the upper surface of the electrode substrate 10, the direction of the rotation is positive when the optical axis of the antiferroelectric liquid cell is rotated counterclockwise from the angle 0°, and it is negative when the optical axis is rotated clockwise.

The following are explanations of various samples prepared.

Sample 1

FIG. 7 shows measured data for the sample 1. In the drawing, A11 to A18 denote cell numbers. The response time ($t_d^+$ and $t_d^-$), the difference ($\Delta t_d$), the mean value ($\Delta t_d/t_{dav}$) and the angle θ° were measured for each liquid crystal cell A11 to A18. Regarding the rubbing conditions, the amount of roller depression was set to 0.3 mm for both electrode substrates 10 and 20.

Sample 2

FIG. 8 shows measured data for the sample 2. In the drawing, B11 to B14 denote cell numbers. The response time ($t_d^+$ and $t_d^-$), the difference ($\Delta t_d$), the mean value ($\Delta t_d/t_{dav}$) and the angle θ° were measured for each liquid crystal cell B11 to B14. Regarding the rubbing conditions, the amount of roller depression was set to 0.3 mm for the electrode substrate 10 (upper side) and set to 0.5 mm for the electrode substrate 20 (lower side).

Sample 3

FIG. 9 shows measured data for the sample 3. In the drawing, C11 to C14 denote cell numbers. Two response times ($t_d^+$ and $t_d^-$), the difference ($\Delta t_d$), the mean value ($\Delta t_d/t_{dav}$) and the angle θ were measured for each liquid crystal cell C11 to C14. Regarding the rubbing conditions, the amount of roller depression was set to 0.5 mm for the electrode substrate 10 (upper side) and set to 0.3 mm for the electrode substrate 20 (lower side).

Figure 10:
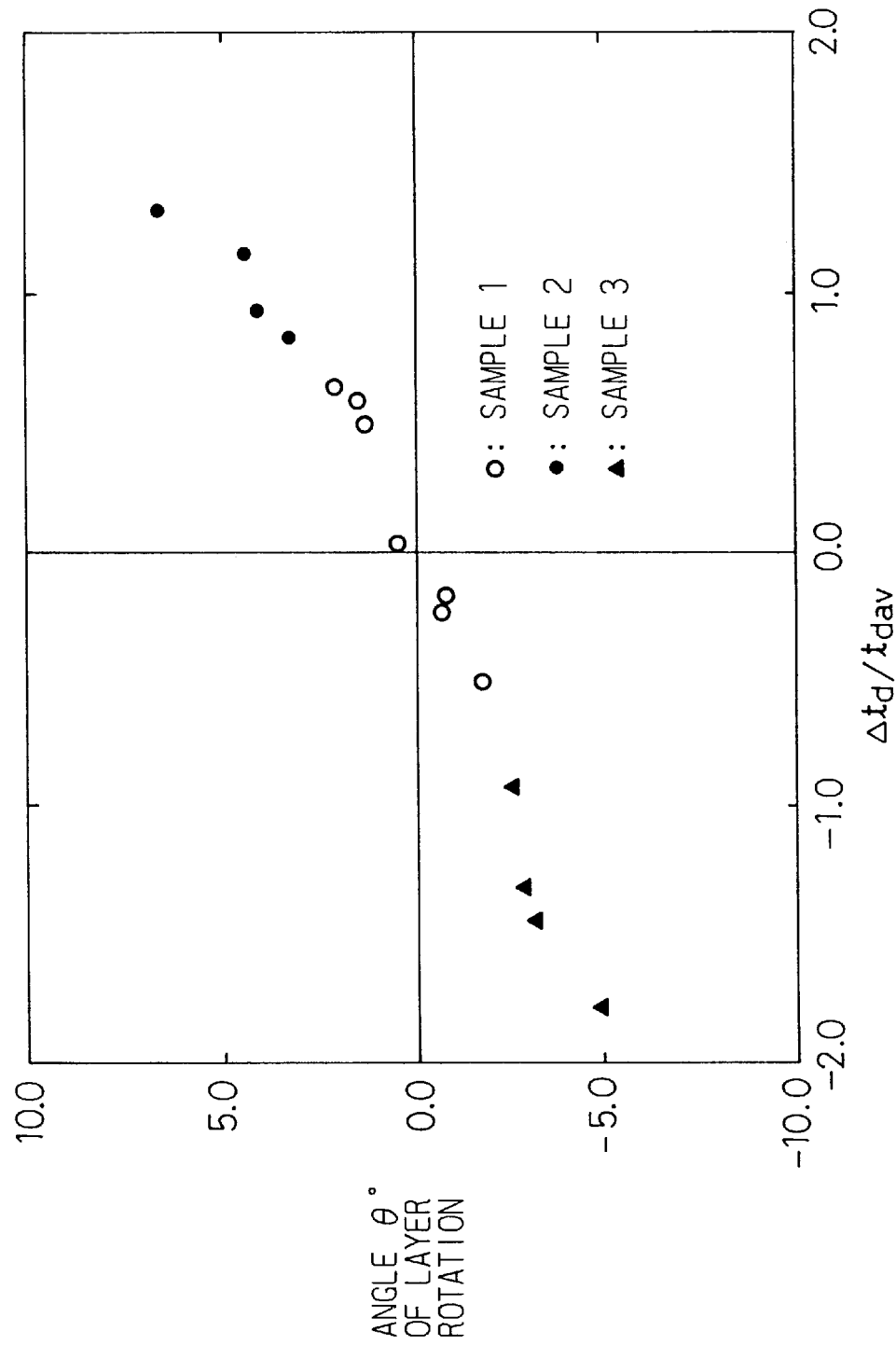
FIG. 10 is a graph for explaining relationship between an angle θ° of the layer rotation and a mean value.

FIG. 10 is a graph for explaining the relationship between the angle θ° of the layer rotation and the mean value ($\Delta t_d/t_{dav}$) In the drawing, the symbol "○" denotes the sample 1, the symbol "●" denotes the sample 2, and the symbol "▲" denotes the sample 3. According to the graph, it is obvious that, when two response time ($t_d^+$ and $t_d^-$) are close to each other, i.e., the difference ($\Delta t_d$) is smaller, the angle of the layer rotation of the antiferroelectric liquid crystal becomes very small.

Further, the inventor found that, when the angle $\theta°$ of the layer rotation is out of the range from $-1°$ to $+1°$, the dark brightness of the antiferroelectric liquid crystal becomes worse so that the contrast of the liquid cell is decreased to under 90% of the initial value. Accordingly, it is preferable to set the range of an allowable angle of the layer rotation within the range from $-1°$ to $+1°$ in order to ensure the preferable contrast on the display.

In the sample 1, when the amount of roller depression is set to the same value between the electrode substrates 10 and 20, the degree of asymmetricity of the response time $t_d$ becomes small as shown in FIG. 7. That is, it is possible to set the angle of the layer rotation of each liquid crystal cell within the allowable range from $-1°$ to $+1°$ except for the liquid crystal cells A11 (1.5°), A12 (2.1°), A14 (1.3°) and A17 ($-1.8°$).

On the other hand, in samples 2 and 3, when the amount of roller depression is set to different values between the electrode substrates 10 and 20, the degree of the asymmetricity of the response time $t_d$ becomes large as shown in FIGS. 8 and 9.

Accordingly, when the electrode substrates 10 and 20 have the same structure and the same rubbing conditions (i.e., depressed amount by the roller), the same control force for controlling the alignment is applied to each alignment film of the electrode substrates 10 and 20 after the rubbing process so that it is possible to suppress the angle of the layer rotation.

Figure 11:
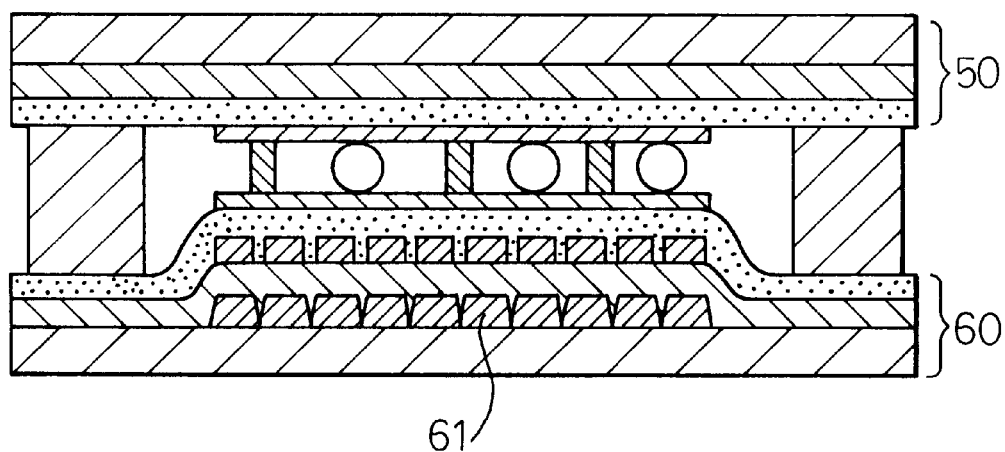
FIG. 11 is a sectional view of the liquid crystal having a color filter.

FIG. 11 is a sectional view of the liquid crystal having a color filter. In the drawing, 50 and 60 denote electrode substrates, and the number 61 denotes a color filter. In this example, the color filter 61 is provided only on the electrode substrate 60 so that the thicknesses of two electrode substrates 50 and 60 are different from each other. Accordingly, it is necessary to previously adjust the rubbing conditions (i.e., amount of depression and rotational speed of the roller) to the electrode substrates 50 and 60 so as to suppress the layer rotation in the allowable angle range mentioned above.

In an actual manufacturing process of the liquid crystal cell, by checking the response time $t_d$, it is possible to reject liquid crystal cells having bad contrast caused by a large angle of the layer rotation.

The second embodiment according to the present invention will be explained in detail with reference to FIGS. 12 to 15.

In a liquid crystal cell using a nematic liquid crystal, as a general method of checking an abnormal alignment of the liquid crystal, the measurement of the optical retardation on the inner surface of the alignment film after the rubbing process is reported by Mr. Nishino et al. (see An Abstract Document in 17-th Liquid Crystal Forum, p 33, 1991). According to this report, an abnormal control force for controlling the alignment film is checked based on an abnormal value of the optical retardation.

The high polymer forming the alignment film is expanded in one axis direction after the rubbing process so that the anisotropicity of the optical refraction index occurs in the rubbing direction. The direction and the size of the anisotropicity are expressed by an optical retardation $\Delta nd$. In general, the liquid crystal molecules are uniformly aligned in an area in which the size of the anisotropicity of the refraction index is uniform.

In the rubbing process, unevenness of the electrode substrate and undesirable substances (for example, dust) are attached to the inner surface of the alignment film to be rubbed so that lack of uniformity of the control force occurs. Regarding the liquid crystal cells A11, A12, A14 and A17 (each of which has large angle of the layer rotation) in the sample 1, it is considered that the lack of uniformity of the control force may occur in these liquid crystal cells.

By getting the control force for the alignment from the viewpoint of the retardation $\Delta nd$, and not from the viewpoint of the mean value ($\Delta t_d/t_{dav}$), the asymmetricity of the response time $t_d$ and the degree of the occurrence of the layer rotation were measured as follows.

In this measurement, a high sensitivity double refraction measuring apparatus was used for measuring the retardation of the alignment film. Sixteen samples of the liquid crystal cells were prepared as the second embodiment. The retardation of each alignment film of the electrode substrates 10 and 20 was measured before the electrode substrates 10 and 20 were superimposed on each other when the measuring spot was set to a diameter of 1 mm.

In this measurement, the retardation was previously measured before and after the rubbing process, and it is possible to eliminate the influence of the foundation by subtracting the value before the rubbing process from the value after the rubbing process. As a result, it is possible to obtain the anisotropicity of the refractive index of the alignment film induced by the rubbing process as the retardation.

Figure 14:
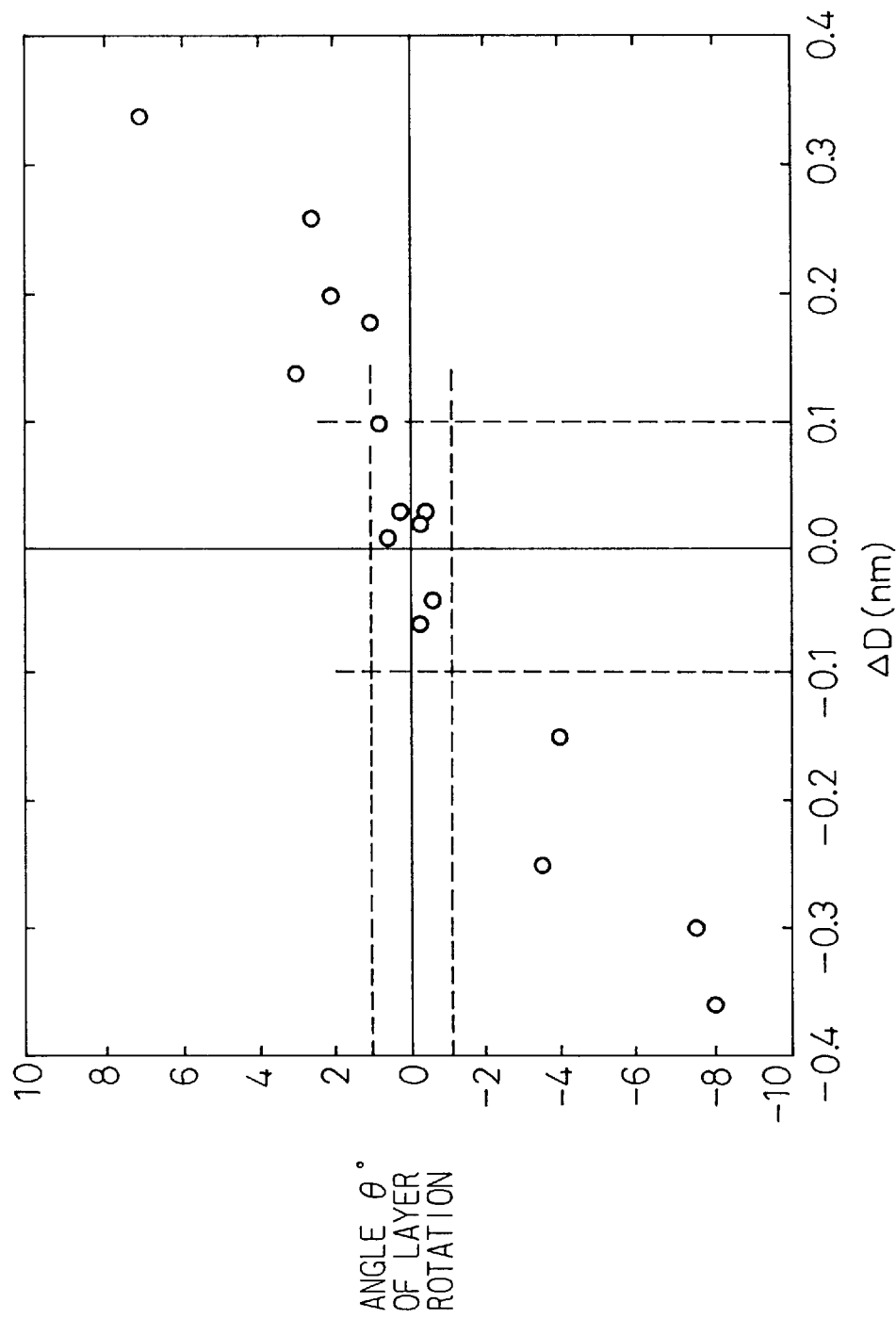
FIG. 14 is a view for explaining the relationship between the angle θ° and a difference of phase difference.

FIGS. 12 and 13 show measured data of the liquid crystal according to the second embodiment. Further, FIG. 14 is a view for explaining the relationship between the angle $\theta°$ and the difference $\Delta D$. In these drawings, D11 to D26 represent the cell numbers. The amount by which the roller is depressed (on the upper and lower electrode substrates), the retardation of the upper electrode substrate $\Delta nd1$, the retardation of the lower electrode substrate $\Delta nd2$, the difference $\Delta D$ ($=\Delta nd2-\Delta nd1$), and the angle $\theta°$ of the layer rotation, were measured for each liquid crystal cell D11 to D26.

According to the above measurements, as shown in FIG. 14, in order to set the angle $\theta°$ within the allowable range from $-1°$ to $+1°$, it is obvious that the difference $\Delta D$ (nm) must be set in the range from $-0.1$ to $+0.1$ (nm) (see D11, D18, and D19 to D23 in FIGS. 12 and 13). That is, by using the retardation $\Delta nd$ ($\Delta nd1$ and $\Delta nd2$) corresponding to the above allowable range, it is possible to suppress the occurrence of the layer rotation of the antiferroelectric liquid crystal.

Figure 15:
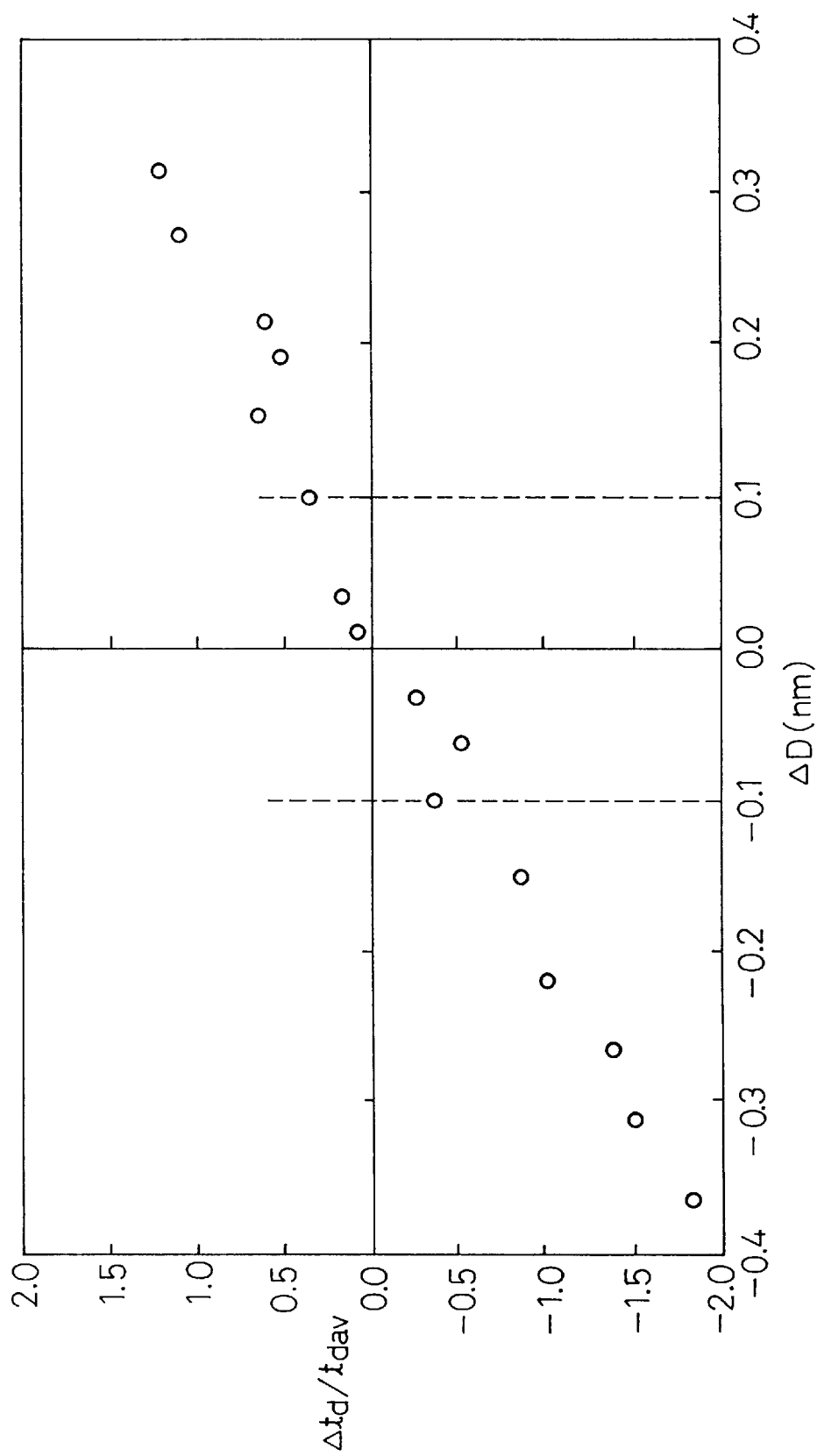
FIG. 15 is a view for explaining the relationship between the difference and the mean value.

FIG. 15 is a view for explaining the relationship between the difference ($\Delta D$) and the mean value ($\Delta t_d/t_{dav}$) According to this graph, it is obvious that the difference $\Delta D$ is proportional to the mean value $\Delta t_d/t_{dav}$. As a result of the above measurement, ideally, it is considered that there is no difference of precision between two methods, i.e., to suppress the layer rotation from the viewpoint of the phase difference of the alignment film in the second embodiment, and to suppress the layer rotation from the viewpoint of the mean value in the first embodiment.

However, in the rubbing conditions, although it is easy to set the depressed amount for the roller and the rotational speed of the roller, but it is not easy to set the other conditions. Accordingly, as mentioned in the sample 1, when the layer rotation of the antiferroelectric liquid crystal is suppressed from the viewpoint of the angle $\theta°$ of the layer rotation and the mean value $\Delta t_d/t_{dav}$, there are dispersions in the resultant data. On the other hand, it is easy and stable to measure the retardation $\Delta nd$ of the alignment film. As a result, it is considered that it is more precise to suppress the occurrence of the layer rotation from the viewpoint of the retardation of the alignment film.

The third embodiment according to the present invention will be explained in detail with reference to FIGS. 16 and 17.

Figure 16:
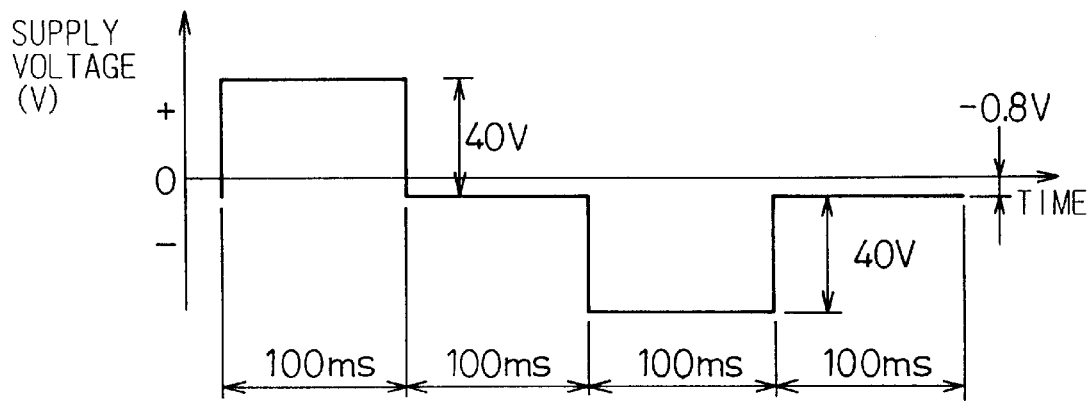
FIG. 16 is a timing chart of the supply voltage when superimposing a DC component onto the AC voltage shown in FIG. 6A.

FIG. 16 is a timing chart of the supply voltage when superimposing a DC component (−0.8v) onto the AC voltage shown in FIG. 6A.

In the first and second embodiments, the explanations were performed as to the liquid crystal cell, which can suppress the occurrence of the layer rotation of the antiferroelectric liquid crystal, from the viewpoint of the mean value $\Delta t_d/t_{dav}$ and the retardation $\Delta nd$. On the other hand, in the third embodiment, the inventor found that, by superimposing a DC component onto the AC voltage (supply voltage) which is applied to the liquid crystal cell, the effective voltage, which is applied to the antiferroelectric liquid crystal, is increased or decreased so that the response time $t_d$ is also increased or decreased. As a result, it is possible to symmetrize the polarity of the response time.

For example, in the liquid crystal cell in the sample 2 mentioned in the first embodiment, the response time $t_d^+$ is 80 ms and the response time $t_d^-$ is 14 ms so that the response time td is asymmetric and the angle θ° of the layer rotation is 7°.

Figure 17:
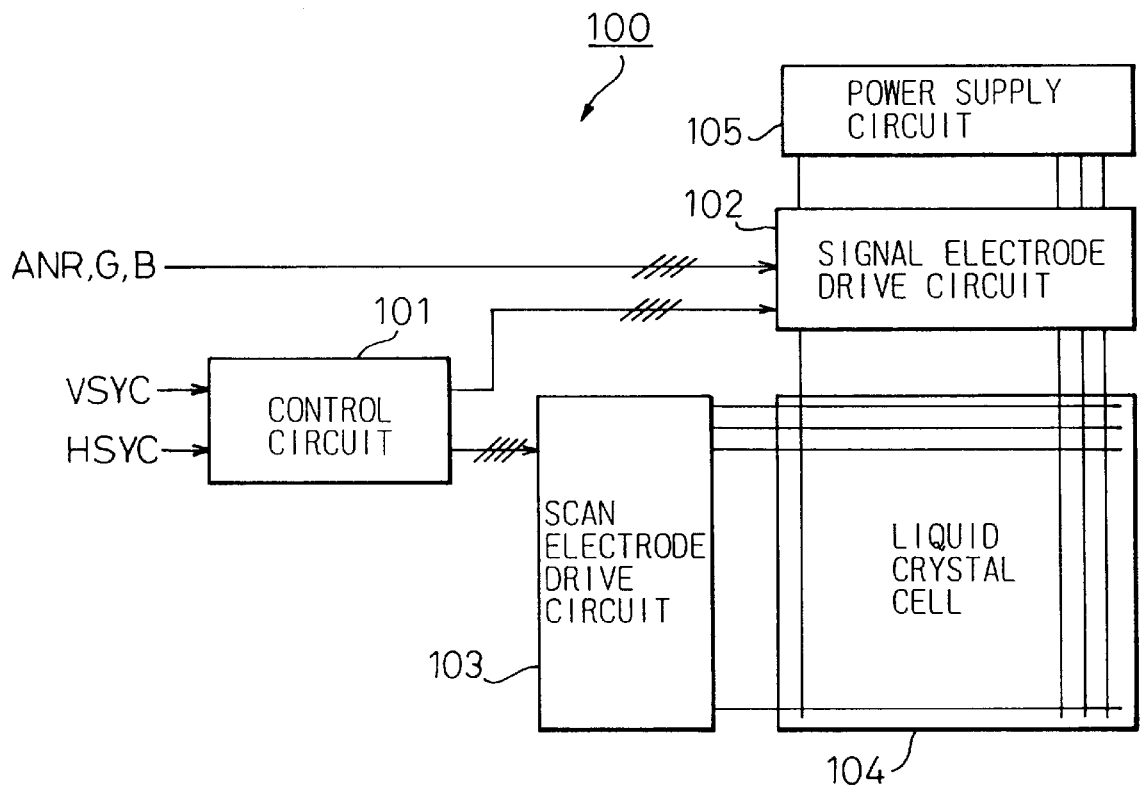
FIG. 17 is a schematic block diagram of a control apparatus connected to the liquid crystal cell.

The voltage shown in FIG. 16, in which the DC component is superimposed onto the AC voltage, is applied to a scan electrode drive circuit 103 in FIG. 17. Further, the polarity of the response time is symmetrized in such a way that the response time $t_d^+$ is 34 ms and the response time $t_d^-$ is 35 ms. As a result, the angle θ° of the layer rotation of the antiferroelectric liquid crystal became approximately 0°.

FIG. 17 is a schematic block diagram of a control apparatus connected to the liquid crystal cell of the first embodiment.

A control apparatus 100 includes a control circuit 101, a signal electrode drive circuit 102, a scan electrode drive circuit 103, a liquid crystal cell 104 and a power supply circuit 105.

In the control apparatus 100, when a vertical synchronizing signal VSYC and a horizontal synchronizing signal HSYC are input to the control circuit 101, the control circuit 101 controls the waveform of the supply voltage to the liquid crystal cell 104 in the scan electrode drive circuit 103. Further, ANR, G and B signals are input to the signal electrode drive circuit 102. The control circuit 101 controls the supply voltage to the liquid crystal cell 104 with the ANR, G and B signals in the signal electrode drive circuit 102.

In the third embodiment of the present invention, the DC voltage which was superimposed on the AC voltage is selected in such a way that the response time $t_d^+$ is equal to or approximated to the response time $t_d^-$. For example, in the optical response waveform shown in FIG. 6B, the DC voltage may be superimposed onto one of the down-slope waveforms (a) and (b) in such a way that the transient time necessary for changing from the state F$^+$ to the state AF (down-slope waveform (a)) is equal to or approximated to the transient time necessary for changing from the state F$^-$ to the state AF (down-slope waveform (b)).

As explained above, in the third embodiment, a combined voltage formed by superimposing the DC voltage onto the AC voltage is applied to the liquid crystal cell on, which the rubbing process was performed (see the first embodiment), in order to suppress the occurrence of the layer rotation. However, it is not restricted to the above process, and it is possible to realize the same result as above by applying the composite voltage to the liquid crystal cell on which the rubbing process was not performed in the third embodiment.

Figure 18:
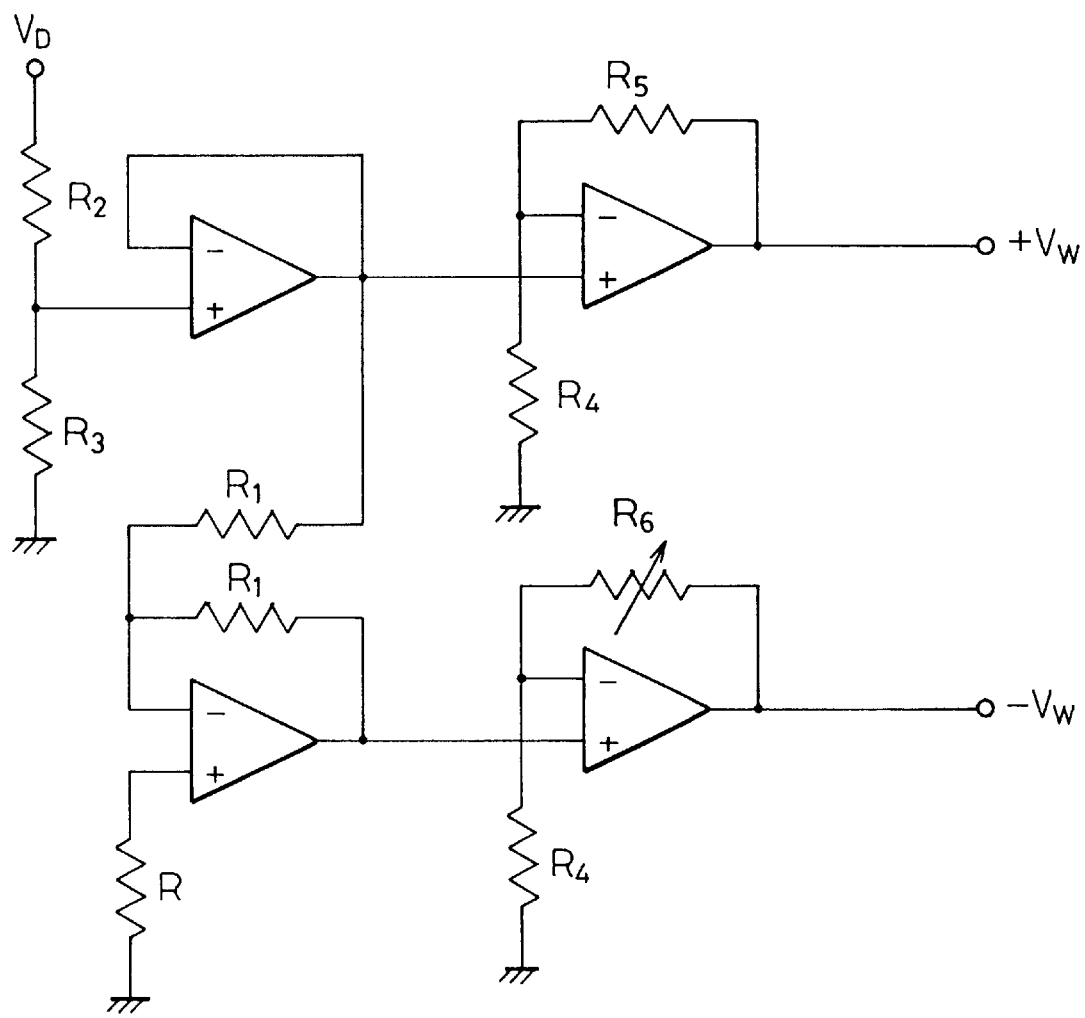
FIG. 18 shows one example of a circuit for superimposing an offset voltage onto the supply voltage.

FIG. 18 shows one example of a circuit for superimposing an offset voltage, and FIG. 19 shows voltage waveforms applied to any pixel in the liquid crystal cell.

The voltage having the waveform in FIG. 19 is applied to any pixel in the liquid crystal cell. The write voltage Vw which is applied to the pixel in the selecting term SEL is about 20 to 30 (v). On the other hand, the holding voltage Vh which is applied to the pixel in the non-selecting term NON-SEL is about 0 to 10 (v).

The write voltages +Vw and −Vw, the holding voltages +Vh and −Vh and the center voltage Vo are applied, from the power supply circuit 105 (see FIG. 17), onto the liquid crystal cell 104 through the signal electrode drive circuit 102. Supply of the offset voltage is adjusted by the power supply circuit 105.

In FIG. 18, for example, this circuit is used in the case of superimposing the offset voltage to the write voltages +Vw and −Vw. In the drawing, $R_2$ to $R_7$ are resistors and $R_6$ is a variable resistor. Further, $V_D$ is a power voltage. The write voltages +Vw and −Vw can be obtained by the following formulas.

$$+Vw=(1+R_5/R_4)\times(R_3/(R_2+R_3))V_D$$

$$-Vw=(1+R_6/R_4)\times(R_3/(R_2+R_3))V_D$$

Accordingly, by comparing $R_5$ with $R_6$, it is possible to superimpose the offset voltage onto the write voltages +Vw and −Vw as follows.

When $R_5$ is equal to $R_6$, $|+Vw|=|-Vw|$

When $R_5$ is larger than $R_6$, $|+Vw|>|-Vw|$

When $R_5$ is smaller than $R_6$, $|+Vw|<|-Vw|$

In the case of superimposing the offset voltage onto the holding voltages +Vh and −Vh, the same circuit arrangement as the above can be used.

Based on the circuit shown in FIG. 18, by adjusting the variable resistor $R_6$ to make the response time $t_d^+$ equal to the response time $t_d^-$, it is possible to suppress layer rotation.

What is claimed is:

1. A liquid crystal cell comprising:

two electrode substrates facing each other through a plurality of spacers;

each electrode substrate being formed by superimposing a glass substrate, a transparent electrode and an alignment film; and an antiferroelectric liquid crystal being injected between the alignment films;

wherein, an alignment treatment is performed on each of the alignment films so that at each moment during the application of a drive voltage between the electrode substrates, an angle of layer rotation of the antiferroelectric liquid crystal is defined within a predetermined allowable range between −1° and +1°, and further wherein the antiferroelectric liquid crystal has smectic strictures and is set to a ferroelectric state when a voltage is applied between said electrode substrates and to an antiferroelectric state when no voltage is applied between said electrode substrates.

2. A liquid crystal cell as claimed in claim 1, wherein said alignment treatments to each alignment film have the same rubbing conditions.

3. A liquid crystal cell as claimed in claim 1, wherein the layer rotation is one in which molecules of the liquid crystal rotate about a common axis.

4. A liquid crystal display device comprising:
a liquid crystal cell including:
   two electrode substrates facing each other through a plurality of spacers, and each electrode substrate being formed by superimposing a glass substrate, a transparent electrode and an alignment film, and
   an antiferroelectric liquid crystal injected between two electrode substrates being set to a first or second ferroelectric state when a positive or negative voltage is applied thereto, and being set to an antiferroelectric state when no voltage is applied thereto; and
   a control apparatus connected to said liquid crystal cell for applying the positive or negative voltage thereto as a supply voltage;
   wherein said control apparatus controls so as to superimpose a direct current component onto the supply voltage and to apply it to the liquid crystal cell so that a response time, $t_d^+$, from a first ferroelectric state to an antiferroelectrc state is related to a response time, $t_d^-$, from a second ferroelectric to the antiferroelectric state in a manner such that:

$$-0.51 \leq 2(t_d^+ - t_d^-)/(t_d^+ + t_d^-) \leq 0.51.$$

5. A liquid crystal cell comprising:
two electrode substrates facing each other through a plurality of spacers;
each electrode substrate being formed by superimposing a glass substrate, a transparent electrode and an alignment film; and
an antiferroelectric liquid crystal being injected between the alignment films;
wherein, an alignment treatment is performed on each of the alignment films so that an angle of layer rotation of the antiferroelectric liquid crystal is defined within a predetermined allowable range and so that a response time, $t_d^+$, from a first ferroelectric state to an antiferroelectric state is related to a response time, $t_d^-$, from a second ferroelectric state to the antiferroelectric state in the antiferroelectric liquid crystal in a manner such that:

$$-0.51 \leq 2(t_d^+ - t_d^-)/(t_d^+ + t_d^-) \leq 0.51.$$

6. A liquid crystal cell as claimed in claim 5 wherein said alignment treatments are performed on each alignment films with the same rubbing conditions.

7. A liquid crystal cell comprising:
two electrode substrates facing each other through a plurality of spacers, each electrode substrate being formed by superimposing a glass substrate, a transparent electrode and an alignment film; and
an antiferroelectric liquid crystal having a smectic layer being injected between the alignment films, the antiferroelectric liquid crystal having an optical axis; wherein
   the smectic layer has a rotational angle which is an angle through which the optical axis rotates from a first position when no voltage is applied between said electrode substrates and a second position when a voltage is applied between said electrode substrates,
   an alignment treatment is performed on each of the alignment films so that the rotational angle is defined within a predetermined allowable range,
   a layer rotation is generated in said smectic layer when a voltage is applied between said substrates, and
   the antiferroelectric liquid crystal is set to a ferroelectric state when a voltage is applied between said electrode substrates and to an antiferroelectric state when no voltage is applied between said electrode substrates.

8. A liquid crystal cell as claimed in claim 7 wherein the predetermined allowable range is between −1° and +1°.

9. A liquid crystal cell as claimed in claim 7 wherein the voltage applied between said two substrates has a symmetrical form.

* * * * *